Figure 1:
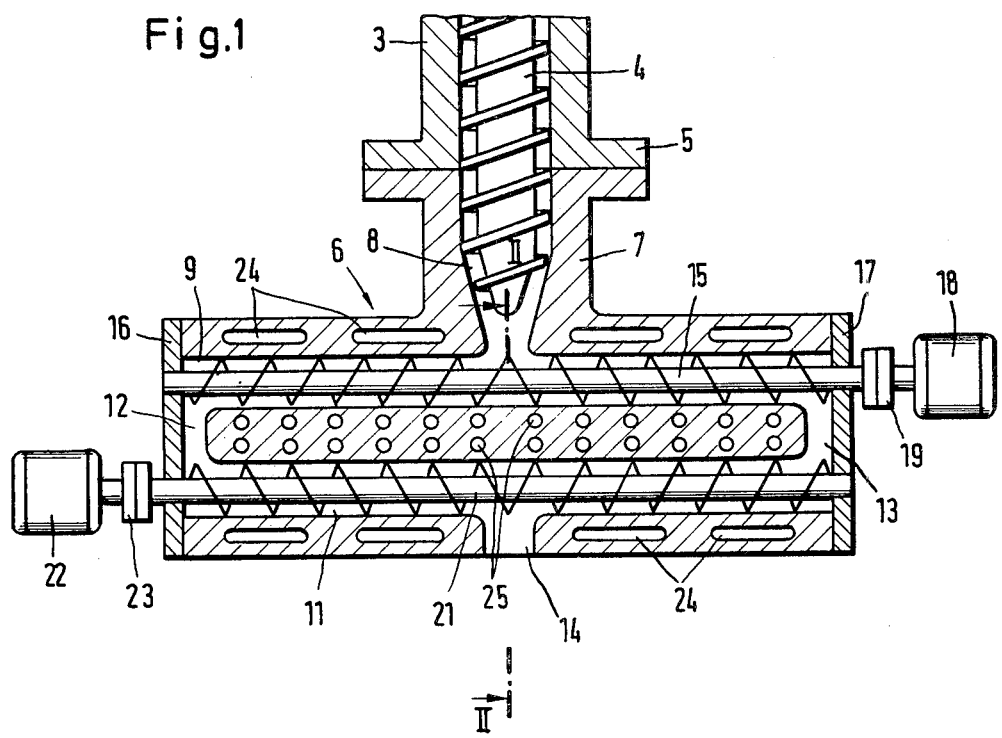

United States Patent [19]

Kolossow

[11] 4,214,862

[45] Jul. 29, 1980

[54] SCREW EXTRUDER FOR THE CONTINUOUS EXTRUSION OF THERMOPLASTIC MATERIALS

[75] Inventor: Klaus-Dieter Kolossow, Hambuhren, Fed. Rep. of Germany

[73] Assignee: Hermann Berstorff Maschinenbau GmbH, Hannover, Fed. Rep. of Germany

[21] Appl. No.: 936,789

[22] Filed: Nov. 3, 1978

[51] Int. Cl.² ............................................. B29F 3/02
[52] U.S. Cl. ..................................... 425/204; 264/51; 366/76; 366/156; 425/205; 425/376 R; 425/378 R
[58] Field of Search ............... 425/204, 205, 559, 560, 425/561, 557, 376 R, 378 R; 366/156

[56] References Cited

U.S. PATENT DOCUMENTS

| | | | |
|---|---|---|---|
| 660,407 | 10/1900 | Werner et al. | 366/156 |
| 2,175,054 | 10/1939 | Ferngren et al. | 425/204 |
| 2,427,960 | 9/1947 | Griffiths | 425/376 R |
| 2,686,335 | 8/1954 | Gross | 425/376 R |
| 3,054,143 | 9/1962 | Stenger | 425/560 |
| 3,151,192 | 9/1964 | Jacobs et al. | 264/53 |
| 3,185,449 | 5/1965 | Kasten | 366/156 |
| 3,224,739 | 12/1965 | Schuur | 425/204 |
| 3,231,243 | 1/1966 | Armstrong | 366/156 |
| 3,259,944 | 7/1966 | McIlvin | 425/557 |
| 3,370,796 | 2/1968 | Herr | 366/156 |
| 3,374,300 | 3/1968 | Azuma | 264/53 |
| 3,577,588 | 5/1971 | Chisholm | 425/376 R |
| 3,632,255 | 1/1972 | Geyer | 425/205 |
| 3,649,147 | 3/1972 | Fritsch | 425/206 |
| 3,679,341 | 7/1972 | Graybill et al. | 425/561 |
| 3,706,827 | 12/1972 | Nott et al. | 425/561 |
| 3,884,452 | 5/1975 | Britten et al. | 425/205 |
| 3,924,841 | 12/1975 | Shinmoto | 425/378 R |
| 4,072,455 | 2/1978 | Beck | 425/467 |
| 4,136,968 | 1/1979 | Todd | 425/204 |

FOREIGN PATENT DOCUMENTS 503875  12/1954  Italy ........................................ 425/203

*Primary Examiner*—Murray Tillman
*Assistant Examiner*—A. H. Koeckert
*Attorney, Agent, or Firm*—Schwartz, Jeffery, Schwaab, Mack, Blumenthal & Koch

[57] ABSTRACT

A temperable screw extruder for the continuous extrusion of thermoplastics materials wherein to increase the working and cooling of the material in the extruder without excessively increasing the length of the extruder means are provided to convey the material in a direction transverse to the axis of a main screw away from said axis and then to convey it back theretowards. Preferably said means comprises, located between the main screw and an extrusion outlet orifice, a transverse screw disposed in a transverse cylinder chamber to direct the plastics melt outwardly transversely to the axis of the main screw, a connection passage at the end of the transverse chamber to a downstream further transverse chamber having a further transverse screw therein to convey the material back towards the axis of the main screw.

2 Claims, 2 Drawing Figures

SCREW EXTRUDER FOR THE CONTINUOUS EXTRUSION OF THERMOPLASTIC MATERIALS

The invention relates to a temperable screw extruder for the continuous extrusion of thermoplastic materials, particularly though not exclusively foamed plastics materials.

In the extrusion of foamed plastics material, particularly that made from polyolefins, it has been found desirable to increase the retention time of the plastics in the screw extruder in order to achieve a uniform foam structure. Apart from the thorough mixing of the foaming plastics melt, an adequate retention time is said to ensure that the melt will be cooled to a certain temperature before emerging from the nozzle. A longer retention time can be achieved by lengthening the extruder, but there are obviously structural restrictions which do not allow unlimited elongation of the extruder.

The invention has among its objects to provide a temperable screw extruder for the continuous extrusion of thermoplastic materials, particularly foamed plastics materials, in such a way that the material can remain in the extruder for an adequate length of time for processing, without the extruder being excessively long.

The invention provides means extending transverse to the conveying axis of a main screw of the extruder, to divert the material in a direction laterally away from the axis of the main screw and then to direct it back towards the axis of the main screw.

The diversion of the material in a direction away from the axis of the main screw, transversely thereto, then again transversely towards the axis of the main screw can give the moulding material a longer retention time in the extruder without requiring excessive lengthening of the extruder. Furthermore the diverting step enables the material to be cooled more effectively, since a larger cooling surface can thereby be available.

In an advantageous embodiment of the invention, a transverse screw is provided in a transverse cylinder chamber located between a main screw cylinder and an extrusion outlet orifice, to direct the material outwardly transverse to the axis of the main screw and at the end of the transverse chamber a connecting passage is provided to a downstream, further transverse screw in a further transverse cylinder chamber, which returns the material towards the axis of the main screw.

The material is thus further worked and constantly revolved by the transverse screw and further transverse screw in the transverse chamber and further transverse chamber, so that new particles of material are constantly brought into contact with the walls of the transverse chamber and further transverse chamber.

In a further advantageous embodiment of the invention the transverse chamber and further transverse chamber extend on either side of the axis of the main screw.

The invention has proved particularly successful for extruding foam plastics from polyolefins. The foam structure of the final product is found to be very uniform.

Figure 2:
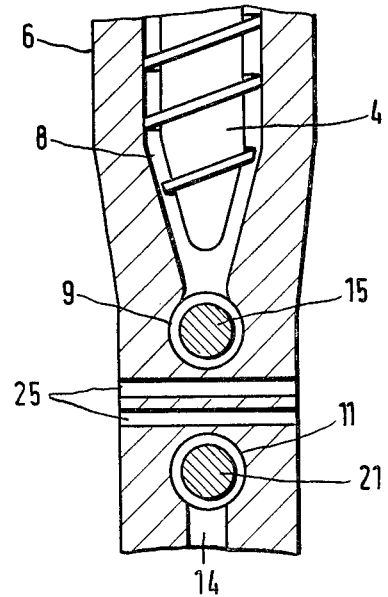

The invention is diagrammatically illustrated by way of example with reference to the accompanying drawing, in which:

FIG. 1 shows a temperable screw extruder according to the invention with two transverse screws arranged in separate cylinders; and FIG. 2 is a cross-section taken along line II—II of FIG. 1.

Referring to the drawing, a screw extruder, only part of which is illustrated, comprises a cylinder 3 with a rotatable screw 4 arranged therein. A housing 6 is attached to an end flange of the cylinder 3. The housing 6 has a shoulder 7 containing a feed bore 8 which is aligned with the bore of the cylinder 3.

The housing 6 has two cylindrical chambers 9 and 11 therein the axes of which extend transverse to the axis of the cylinder 3. The chamber 9 is in communication, at a mid-position in its length, with the feed bore 8. The chambers 9 and 11 are in communication one with the other at their ends by connection passages 12 and 13. The chamber 11 has an extrusion outlet orifice 14 aligned with the axis of the cylinder 3. A transverse screw 15 is disposed in the chamber 9. The screw 15 has outwardly conveying screw lands on both sides of the mid-position in its length, is mounted in lateral end plates 16 and 17 of the housing 6 and is driven by a motor 18 via a coupling 19.

The chamber 11 has a transverse screw 21 disposed therein which is also rotatably mounted in the end plates 16 and 17. The screw 21 also has screw threads of opposite hand on either side of the extrusion outlet orifice 14. The pitch of the screw threads are arranged so that, with the screw 21 driven by a motor 22 via a coupling 23, material is conveyed from the ends of the screw 21 to the middle thereof and to the extrusion outlet orifice 14.

Tempering passages 24 and tempering bores 25 are provided in the walls of the housing 6.

The apparatus described operates as follows:- plastics moulding material to be processed is melted and an expanding agent is mixed in by the extruder 3, 4. The screw 4 conveys the plastics melt through the feed passage 8 into the first chamber 9. The opposite pitches of the screw lands on screw 15 on either side of the feed passage 8 sub-divide the plastics melt and direct it outwardly from the axis of the screw 4. The melt is transported to the ends of the transverse screw 15 and is thereby further worked and constantly revolved, so that new particles of the melt are constantly coming into contact with the wall of the housing, which is cooled via the cooling passages 24 and the cooling bores 25. At the outer ends of the chamber 9 the plastics melt is forced through the connection passages 12 and 13 into the chamber 11 and engaged by the screw 21. The screw 21 conveys the melt towards the axis of the screw 4 and the melt is further worked and cooled by the constant revolving action. It is forced out through the extrusion outlet orifice 14 which orifice may take any one of various well known forms.

What is claimed is:

1. A screw extruder for the continuous extrusion of thermoplastic materials, comprising:
   (a) a main extruding screw rotatably mounted in a housing therefor, said thermoplastic material being fed to and mixed by said main extruder screw, said housing defining an outlet feed passage at the bottom of said main screw;
   (b) a first cylindrical chamber extending transversely to the axis of said main screw and communicating with said outlet feed passage;
   (c) a first transverse screw mounted in said first cylindrical chamber, said screw having conveying screw lands formed thereon which extend laterally outwardly from said outlet feed passage so as to convey said material laterally away from said feed passage to an outer end of said chamber;

(d) means adjacent said first cylindrical chamber for cooling said material as it is mixed and laterally conveyed;

(e) a second cylindrical chamber extending transversely to the axis of said main screw and spaced from said first chamber, said second chamber communicating with an extrusion outlet orifice positioned generally below said outlet feed passage;

(f) a second transverse screw mounted in said second chamber and having screw lands formed thereon which extend laterally outwardly from said extrusion outlet orifice, the pitch of said screw lands being such as to convey material delivered to an outer end of said second cylindrical chamber toward said outlet orifice;

(g) means adjacent said second cylindrical chamber for cooling said material as it is mixed and conveyed toward said outlet orifice, and (h) connecting passage means intercommunicating the outer ends of said first and second cylindrical chambers, whereby said material is thoroughly mixed and conveyed from said main extruding screw, laterally outwardly through said first chamber, through said connecting passage means and said second chamber to said outlet orifice.

2. The screw extruder of claim 1 wherein said first and second transverse screws each include separate land sections of opposite pitch, with the pitch of said lands on said first transverse screw being such as to convey material laterally away from said outlet feed passage, and the pitch on said lands of said second transverse screw being such as to convey material toward said outlet orifice, said first and second chambers extending around the entire length of said first and second transverse screws, and a further connecting passage at the end of said extruder opposite to said connecting passage means whereby material is conveyed from said first chamber through said further connecting passage to said second chamber to said outlet orifice.

* * * * *